United States Patent [19]

Baston et al.

[11] 4,083,096

[45] Apr. 11, 1978

[54] INSULATED WIRE STRIPPING METHOD

[75] Inventors: Irv Baston, Bremen, Ga.; J. Orbie Lowery, Ranburne, Ala.; O. Leon Thomas, Carrollton, Ga.

[73] Assignee: Southwire Company, Carrollton, Ga.

[21] Appl. No.: 693,456

[22] Filed: Jun. 7, 1976

Related U.S. Application Data

[62] Division of Ser. No. 648,083, Jan. 12, 1976, Pat. No. 3,977,277.

[51] Int. Cl.² ................. B23P 19/00; H02G 1/12
[52] U.S. Cl. ................................. 29/427; 29/403; 83/425.2
[58] Field of Search ........... 81/9.51; 29/403, 427; 30/90.4, 90.8; 83/924, 425.2, 425

[56] References Cited

U.S. PATENT DOCUMENTS

| | | | |
|---|---|---|---|
| 1,551,875 | 9/1925 | Hall | 81/9.51 |
| 2,360,363 | 10/1944 | Pope | 81/9.51 |
| 2,374,211 | 4/1945 | Kane | 81/9.51 |
| 2,485,518 | 10/1949 | Vermette | 81/9.51 |
| 3,136,045 | 6/1964 | De Rieux et al. | 81/9.51 |
| 3,309,947 | 3/1967 | Denney | 81/9.51 |

FOREIGN PATENT DOCUMENTS

| | | | |
|---|---|---|---|
| 962,717 | 4/1957 | Germany | 81/9.51 |

*Primary Examiner*—James L. Jones, Jr.
*Assistant Examiner*—Roscoe V. Parker

*Attorney, Agent, or Firm*—Herbert M. Hanegan; Stanley L. Tate; Robert S. Linne

[57] ABSTRACT

A device for continuously stripping the insulation off of electrical wires, particularly solid conductors as opposed to stranded conductors, for the re-cycling thereof in the manufacturing process, including an initial cutting section and a subsequent stripping or insulation removal section. The cutting section utilizes two opposed, interdigitated sets of dual rotary "cutters," each having two juxtaposed cutting edges or blades, only one of which however is used to cut at any one time. One "cutter" is used to form a "V" section to laterally hold the wire in position, while the other opposed cutter has one of its blades located centrally within the "V" section of the other holding "cutter" (note FIG. 4). When the insulated wire is passed through the device, the cutting blade cuts through the insulation continuously down along the longitudinal length of the wire, and the wire with the cut insulation is then passed through a stripping orifice in a conical "extruder" section to remove the insulation on a continuous basis. The cutting pressure is adjustable by a spring biased T-handle mechanism which includes two opposed, pivoting arms carrying the upper set of rotary blades which allows them to be pivoted in a generally perpendicular direction with respect to the lower rotary blades. The four cutter blades are also laterally adjustable in position on threaded shafts so that each of the four blades can be utilized in turn as the actual cutting blade. After being stripped, the bare conductor is wound onto an automatic coiler which pulls the wire through the device.

1 Claim, 4 Drawing Figures

INSULATED WIRE STRIPPING METHOD

This is a division of application Ser. No. 648,083, filed Jan. 12, 1976 and now U.S. Pat. No. 3,977,277.

BACKGROUND OF THE INVENTION

The present invention relates to a continuous wire stripping machine and method for stripping and separating the insulation from insulated wires, particularly solid conductor wire as opposed to stranded conductors, for the recycling thereof in the manufacturing process. The device of the present invention includes two interdigitated sets of rotary cutters in a cutter section, with each cutter having two cutting edges, only one of which is utilized at any one time, with a subsequent fixed mechanical stripping section.

2. General Background and Prior Art

To provide insulated electrical conductor wire, it is the standard common practice to extrude onto a conductive wire a plastic coating of a particular thickness covering the exterior of the wire. A typical insulating plastic used is polyvinylchloride (PVC). However, in the manufacturing process for the insulated wire, the finished product is sometimes rejected because the insulation is too thin or too thick or the inner wire is undersized or other problems exist to cause the product not to pass inspection.

In the past, if the wire was either oversized, undersized, too hard, or the elongation on the compound was not enough, often approximately 30,000 feet of finished wire was run before an inspector had time to check the wire and determine its faults. Then everything was sent to the reclamation department and, heretofore, the entire insulatng jacket and conductor were scrapped.

In the past, the PVC jacket would be stripped off by crushing it off of the inner conductor wire, often destroying the inner wire or at least substantially marring it. The inner, damaged conductor wire, generally of solid aluminum or copper, would then usually be melted. It is noted that most strippers operating on a "crushing" principle destroy an aluminum conductor insofar as direct product recycling is concerned, although a "crusher" works fairly well with copper but still produces a small amount of "wire flattening." Hence, using these prior techniques, there was a substantial loss in that both the insulating jacket and the conductor metal usually had to be totally reprocessed for the reuse thereof. Also, when using the "crushing" system of the prior art, speeds of only 100-150 feet per minute were achievable.

The prior art "crusher" stripper usually included a crude razor blade device and crushing rollers.

Other types of wire strippers besides "crushing" strippers are of course also known. For example U.S. Pat. No. 2,956,717 to Scharf (issued Oct. 18, 1960) discloses an intermittent stripper which pre-treats separated, selected portions of the insulating coating with a jet of gaseous refrigerant to embrittle it, and then the embrittled section is cut and the cut fractured on opposite sides by blunt stripping tools. U.S. Pat. No. 3,666,596 to Morton (issued May 30, 1972) discloses the technique of prestretching the coated wire in the longitudianl direction to internally break loose the outer coating from the inner wire for greater ease in stripping.

Insofar as the general wire handling aspects of the present invention, the U.S. patents to Jagger (U.S. Pat. No. 1,448,543; issued Mar. 13, 1923) and Jagger et al (U.S. Pat. No. 1,543,924; issued June 30, 1925) directed to rope untwisting apparati were brought to applicants' attention.

GENERAL DISCUSSION OF THE PRESENT INVENTION

In the preferred embodiment of the present invention a rotary cutter system is used to initially and continuously cut the insulating coating down along its longitudinal length as the insulated wire is passed by it, and the wire with the cut insulation is then passed through a stripping orifice having a diameter substantially equal to the diameter of the inner conductor wire but less than the diameter of the insulating covering, which orifice mechanically bears against the cut insualting covering separating and stripping it from the inner wire on a continuous basis.

In the present invention the insulation is stripped off without damage to the inner copper or aluminum wire. Thus if the inner bare wire itself is of the correct size it can be taken up on a bobbin and used in other processes, or put into a stem pack and used for a ground wire. Also, for example, if the inner wire is undersized for, say No. 12 size, it can be put on a bobbin and taken to the fine wire department and used as a feeder start, i.e., it can be fed right off the bobbin into the wire drawing machine to make a different size wire from it. With the present invention, processing speeds of 300-350 feet per minute have been achieved in the stripping operation.

The present invention thus overcomes the prior art deficiencies by providing a system which positively strips the insulation from the wire without any damage to the inner wire and yet achieves this action in a structure which is highly compact and fast and allows a relatively large number of different size wire to be stripped by the same device and allows the use of the device over a relatively long period of time without having to completely remove and replace the rotary cutting element.

The flexibility and long term use of the device is achieved in the present invention by means of two opposed, interdigitated sets of dual rotary "cutters," one spring biased or pressured toward the other on a pivoted support system, each rotary cutter having at least two juxtaposed cutting edges or blades, only one of which however is used to cut the insulation at any one time. One "cutter" is used to form a "V" section to laterally hold the wire in position, while the other opposed, actual cutter has one of its blades located centrally within the "V" section of the other holding "cutter."

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein:

FIG. 1 is an isometric view of the preferred embodiment of the wire stripper of the present invention, with its cutting section and its mechanical stripping section, showing a solid conductor wire being stripped of its insulation; while

FIG. 4 is a partial, close-up, detailed front view of the rotary cutters showing the wire cutting and holding interdigitated fit of the rotary cutters.

DESCRIPTION OF THE PREFERRED EMBODIMENT

Figures 1, 4:
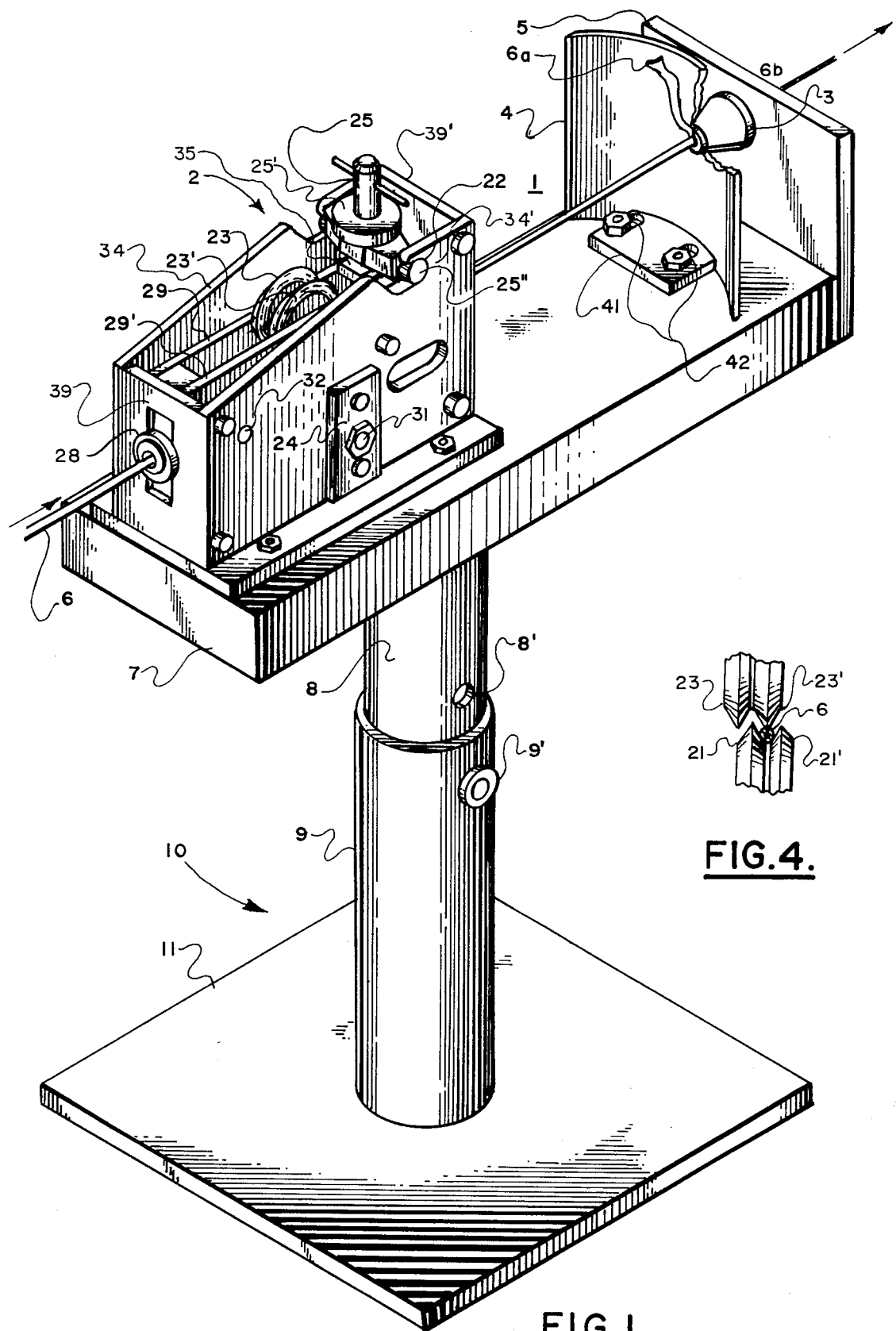

As illustrated in FIG. 1, the preferred embodiment of the wire stripping machine 1 of the present invention includes an insulation cutting mechanism or section 2 which is mounted on upper frame platform 7 which in turn is supported by stand 10. The machine also includes a stripping mechanism or section comprising stripping shield 4, conical stripper 3 and rear support member 5.

Figure 2:
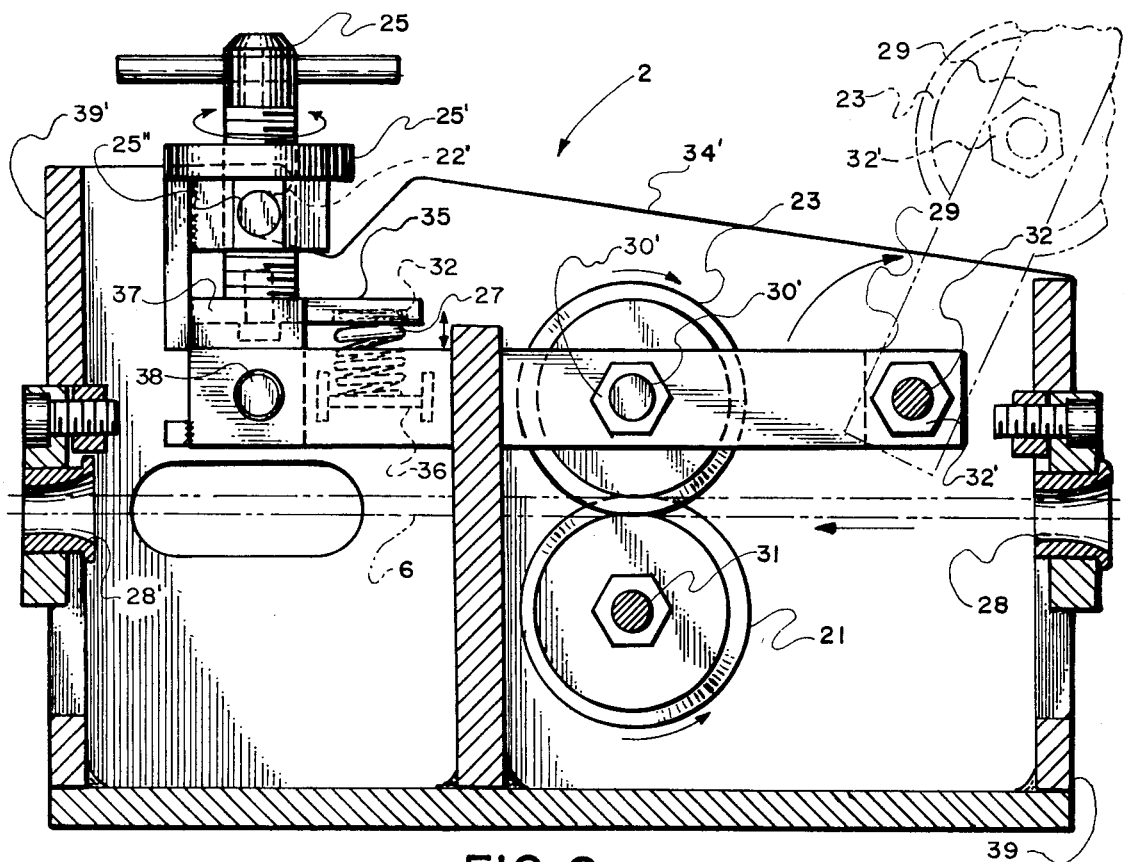
FIGS. 2 and 3 are side cross-sectional and top views, respectively, of the cutting section with its "V" forming rotary cutters and their supporting housing including the threaded shafts and tension adjusting apparatus of the preferred embodiment of FIG. 1.
Figure 3:
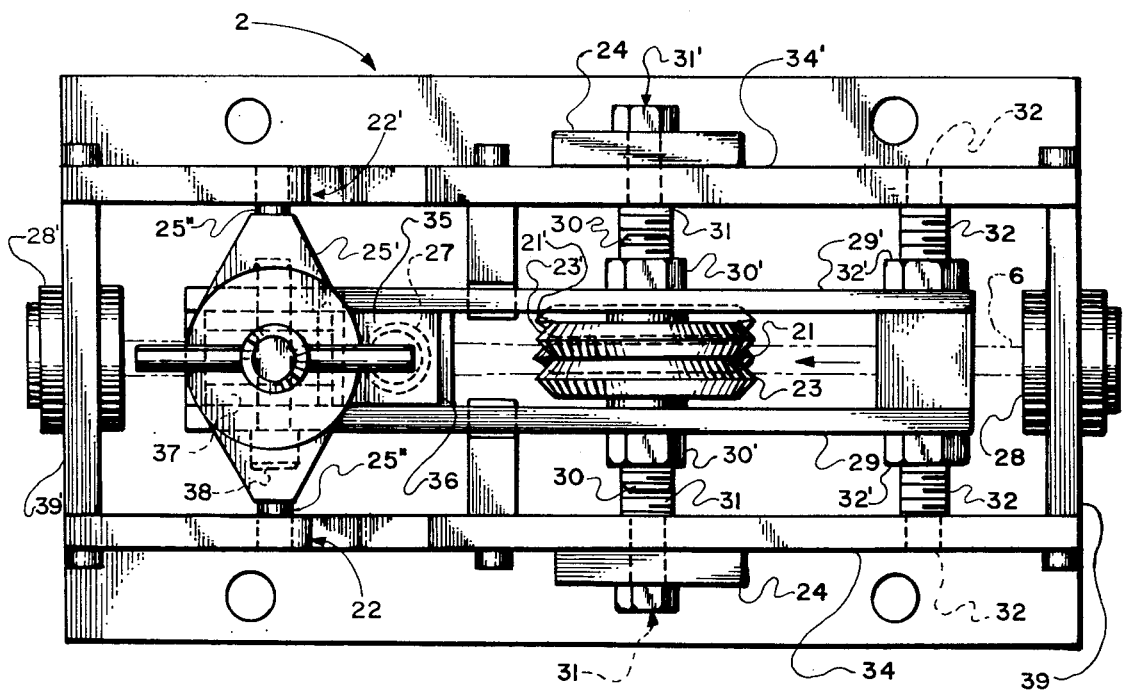

As seen particularly in FIGS. 2 and 3, the insulation cutter mechanism 2 includes two opposed sets of rotary cutters, each set having two, juxtaposed cutting edges or blades 21 & 21', and 23 & 23', which freely rotate on threaded shafts 31 and 30, respectively. Shaft 31 is supported directly by side facing walls 34 and 34', while shaft 30 is supported by longitudinal, side bars or arms 29 and 29' which are mounted on and can pivot about shaft 32.

As best seen in FIG. 4, the two opposed sets of rotary cutters, the bottom set 21, 21' and the top set 23, 23', have their opposing blades interdigitated, with each set of juxtaposed blades forming a "V" section. Although each blade is initially provided with a sharp cutting edge, only one blade (e.g., blade 23' in FIG. 4) at any particular time is cutting the insulating covering on the insulated wire 6. The opposing blades (e.g., blades 21, 21' in FIG. 4) serve as a holding, positioning and centering means for the wire 6 during the cutting of the insulating wire by the centrally located, opposing cutting blade. The remaining blade (e.g., blade 23 of FIG. 4) is then idle or non-operative.

The rotary cutters 21, 21', 23, 23' can be made up of simple, stock, hardened "V"-shaped, double roll (duplex) bearings which have been made into good quality cutters by simple grinding the "crest" to a cutting knife edge.

The upper rotary blades 23, 23' are mounted on the threaded shaft 30 and arms 29, 29' to the shaft 32 so that they can be easily laterally adjustable by means of the nuts 32' with respect to the lower rotary blades 21, 21' in the axial direction, that is parallel to their common axis of rotation. This lateral adjustability allows either blade 23 or 23' to be positioned between the lower rotary blades 21, 21'. Accordingly, depending upon whether wire 6 is fed between blades 21, 21' (as illustrated in FIG. 4) or between blades 23, 23', and which of the blades is positioned between the opposing pair of blades, each of the cutting blades 21, 21', 23, 23' can be used as the actual cutting element at any particular time, allowing relatively long use of the system without having to physically remove and replace a dull blade. Thus, with its lateral adjustability and the dual functioning of the blade pairs as both cutting elements and holding means, the present invention produces in effect four times the use time as compared to a device with a single blade.

In operation, of course, the cutting edge on the blade being used to cut will become dull after a length of time. Thus, when this happens, all that is required is to stop the machine and laterally move the upper blades over one position and appropriately position the wire 6 between the set of rotary "cutters" which the operator desires to use as a holder for the wire. The blades can thus be "changed" four times before each cutter blade needs to be reground to obtain a sharp edge.

In contrast to the upper set of rotary cutters 23, 23', the lower set 21, 21' are basically stationary with respect to their lateral and vertical positioning. Additional, fine, lateral positioning adjustment of the upper blades 23, 23' can be achieved by the nuts 30' on the threaded shaft 30.

In order to produce a good longitudinal cut in the outer insulating covering as the wire 6 is passed between the opposing sets of rotary blades, the sets of rotary cutters are biased toward each other with a variable resilient spring pressure which opposes although allows the opposed sets of rotary cutters to be separated. This adjustable tension allows the imposition of the proper amount of cutting pressure so that the cutting blade cuts a fine, longitudinal line through the insulation without marring the inner wire under the insulation, and yet allows different sized wires and different thicknesses of insulating coverings to be stripped.

The tension adjusting mechanism of the preferred embodiment include the side bars 29 and 29' which pivot on shaft 32. The tension pressure itself is provided by spring 27, with pressure being either increased or lessened by appropriately turning threaded T-handle 25. T-handle 25 is supported and threaded through support latch member 25'; while support latch 25' in turn is latched in place by lateral arms 25" fitted into slots 22, 22' of side walls 34, 34', respectively.

It is noted that, except for the restraint provided by the spring 27 acting between upper and lower members 35, 36, the upper member 35 is free to move down with respect to the longitudinal side arms 29, 29' with their fixed vertical side extension plates 37, 37', compressing the spring 27 as the handle 25 is rotated down through its temporarily fixed support latch 25'. Thus, when the handle 25 is rotated down, the pressure on the upper set of rotary cutters 23, 23' against the lower set of rotary cutters is increased, and, correspondingly, when the handle 25 is rotated up, the pressure is decreased.

It is further noted that, when the spring 27 is under compression, it further serves to maintain the lateral latching arms 25" seated in the side slots 22, 22'. However, when it is desired to pivot the upper set of rotary cutters 23, 23' out of the housing (note phantom lined position in FIG. 2), the handle 25 is merely rotated out, at least reducing or eliminating the upward tension on the lateral arms 25", until it and its support latch 25' can be easily pivoted over about latch pivot pin 38, pivoting the lateral latching arms 25" out of the seats 22, 22'.

Ceramic eyelet guides 28, 28' are provided at the entry and exit portions of the cutter housing in slots in the end walls 39, 39' to protect the wire 6 as it passes through the cutter housing.

After leaving the cutter section 2, the wire 6 with its insulation longitudinally cut is then passed through the stripper section for removal of the insulation 6A from the inner wire 6B. The stripper section includes a stripper shield 4, a rear support plate 5 and a stripper cone section 3 mounted therebetween.

The stripper cone 3, which can be a standard extruder cone, has an orifice in its smaller, tip section which is exposed through a relatively large opening in the shield 4. The diameter of the orifice is substantially equal to the diameter of the inner wire 6B, although it can be a little large but must be less than the outer diameter of the insulation covering 6A. As the inner wire 6B is passed through the stripping orifice, the edges of the fixed orifice physically and mechanically bear against the cut insulation 6A, causing it to be peeled off of the inner wire 6B, the shield 4 serving to generally deflect and collect the stripped insulation 6A.

Although the opening in the shield 4 could be designed to strip the cut insulation from a particular, restricted range of inner wires, a separate "extruder" cone 3 is considered preferable because various ones of the "extruder" cones are readily available with different sized orifices for various sized wires, and the cones can be easily replaced and substituted, as appropriate. Such cones have a standard size, threaded exterior at the larger end section which can be used to mate with a like threaded section in an appropriate, large opening in the rear support 5. The stripping shield 4 is held in place by its own welded bracket 41 which is fastened through slots by nuts and bolts 42 to the platform 7. The slots allow the shield 4 to be relatively easily moved out of the way for substituting the various stripping "extruder" cones on the rear support 5.

The stand 10 for the platform 7 is comprised of two concentric, telescoping pipes 8, 9 which are adjustably held by appropriately placing pin 9' through the selected one of vertically aligned holes 8'. Pipe 9 is directly welded to base plate 11.

In operation, the cutter section 2 thus first makes a fine, razor-type cut through the insulation along the length of the wire 6, opening the insulating jacket or covering 6A, and the "extruding" orifice in the cone 3 forces the jacket 6A off the inner wire 6B, all on a continuous basis. The stripped off insulation 6A can be guided into a collecting box as long strips with one edge cut out.

The removed insulation 6A can then be granulated and put in the standard plastic blender as reground compound. It is acceptable to have as much as ten percent reground mixed with virgin compound.

The bare, stripped wire 6B can then be reused as is, because it is undamaged or unmarred, or used as a feeder start in the manufacturing process.

After exiting the final, stripper section, the bare wire 6B is coiled up on an automatic coiler (not illustrated). No separate drive is required for the wire or the rotary cutters, because the wire is simply pulled through the stripping device by the automatic coiler. However, if desired, the rotary cutters can be separately driven if desired.

Like most mechanical devices, many variations in design or structure are possible in the preferred embodiment detailed above, and the foregoing suggested variations are merely exemplary.

The above are, of course, merely exemplary of the possible changes or variations. Because many varying and different embodiments may be made within the scope of the invention concept herein taught and because many modifications may be made in the embodiment herein detailed in accordance with the descriptive requirements of the law, it should be generally understood that the details herein are to be interpreted as illustrative and not in a limiting sense.

What is claimed as invention is:

1. An improved method of removing the insulating covering from the inner wire of an insulated electrical conductor wire of the type where the initial cutting of the insulating covering is followed by subsequent stripping of said covering wherein the improvement comprises the steps of:
    (a) providing a non-powered machine consisting essentially of resiliently mounted means for cutting said insulating covering, means for positioning said insulated electrical conductor wire and means for stripping said covering from the inner wire, wherein said cutting means and said positioning means are two opposed, interdigitated, W-shaped sections, rotatably mounted in spaced relationship to each other;
    (b) positioning said insulated electrical conductor wire diametrically between said cutting means and said positioning means without substantially deforming said wire,
    (c) pulling said insulated electrical conductor wire through said non-powdered machine, whereby said insulating covering is cut by one of the two apexes of the first W-shaped section while being positioned in the valley of the second W-shaped section;
    (d) adjusting said resiliently mounted cutting means to substantially cut only the insulating covering, without damage to the inner conductor wire, in a single longitudinal direction along the length of the wire, and
    (e) continuously passing the wire with its cut insulating covering through the stripping means, said stripping means having a fixed orifice bearing against said cut insulating covering but not against the inner wire thereby stripping the cut insulation off and away from the inner wire,
    (f) substantially passing an additional length of insulated wire through said machine so that the insulated covering is cut by one of the apexes of the second W-shaped section while being positioned in the valley of the first W-shaped section.

* * * * *